United States Patent [19]

Prasad

[11] Patent Number: 5,363,679
[45] Date of Patent: Nov. 15, 1994

[54] STEERING WHEEL LOCKING APPARATUS

[76] Inventor: Romeo Prasad, 10 Warren La., Windsor, Conn. 06095

[21] Appl. No.: 993,294

[22] Filed: Dec. 18, 1992

[51] Int. Cl.⁵ .............................................. B60R 25/02
[52] U.S. Cl. ........................................ 70/209; 70/226; 70/238
[58] Field of Search .................. 70/14, 16, 18, 19, 57, 70/58, 199-212, 225, 226, 238, 227, 237, 39

[56] References Cited

U.S. PATENT DOCUMENTS

| | | | |
|---|---|---|---|
| 1,443,009 | 1/1923 | Davis | 70/226 |
| 1,443,285 | 1/1923 | Smith et al. | 70/200 |
| 1,501,934 | 7/1924 | Wise | 70/227 X |
| 4,085,600 | 4/1978 | Bindari | 70/39 |
| 4,089,195 | 5/1978 | Lai | 70/16 |
| 4,730,470 | 3/1988 | Zane et al. | 70/199 X |
| 4,747,279 | 5/1988 | Solow | 70/199 X |
| 4,825,671 | 5/1989 | Wu | 70/238 |
| 4,982,810 | 1/1991 | Toy | 70/237 X |
| 5,099,664 | 3/1992 | Wen-Yin | 70/209 |
| 5,138,853 | 8/1992 | Chen | 70/226 X |
| 5,157,951 | 10/1992 | Chen et al. | 70/226 X |
| 5,197,308 | 3/1993 | Pazik | 70/209 |

Primary Examiner—Peter M. Cuomo
Assistant Examiner—Suzanne L. Dino
Attorney, Agent, or Firm—Robert S. Smith

[57] ABSTRACT

Apparatus for preventing theft of an automobile by obstructing rotational movement of an associated steering wheel of an associated automobile where the steering wheel has spokes connecting a hub to a rim, which includes a bar having a length that is greater than the diameter of the associated steering wheel with which the apparatus cooperates. The bar has first and second axial portions. The apparatus includes first and second apparatus for engaging at least two spokes of the associated steering wheel and apparatus for securing the first and second apparatus for engaging respectively to the first and second axial portions of the bar. The apparatus also includes apparatus for engaging the spokes of the steering wheel to the bar.

10 Claims, 2 Drawing Sheets

STEERING WHEEL LOCKING APPARATUS

BACKGROUND OF THE INVENTION

The invention relates to automobile security apparatus and more particularly to apparatus for restraining movement of the steering wheel of an automobile to reduce the risk of theft of the automobile.

The prior art includes various apparatus which are intended to secure the steering wheel of an automobile. Some such devices use fork members fixed to a telescoping shaft. The telescoping shaft is extended to provide an engagement of the fork members with diametrically opposed portions of the steering wheel. Typically, the shaft will have a length that is substantially greater than the diameter of the steering wheel. The intent of such apparatus is that if a thief attempts to steal the vehicle, the relatively long shaft will prevent rotation of the steering wheel sufficiently to make the vehicle usable.

Other prior art devices provide a connection between the steering wheel and the brake pedal. Typically, these devices also use two U-shaped members which engage the foot pedal and a portion of the rim of the steering wheel. In such structures, typically a telescoping shaft has two U-shaped portions. In operation, the user will draw the two U-shaped shaped members snugly against the arm in which the brake pedal is carried and the rim of the steering wheel. This arrangement is intended to deny a potential thief the opportunity to move the steering wheel and also the opportunity to apply brake pedal pressure.

A major deficiency of such prior art locking apparatus is that the rim of a typical steering wheel is made from a plastic resin material. Such material may easily by cut and is therefore very easy for a thief to merely cut an arcuate portion of the steering wheel rim out of the steering wheel, disengage the lock and proceed with the theft of the automobile.

SUMMARY AND OBJECTS OF THE INVENTION

It is an object of the invention to provide apparatus which will have the advantages of being easily attached to the steering wheel and relatively inexpensive but will not be inherently vulnerable to a thief merely cutting an arcuate portion of the steering wheel rim away and proceeding with the theft of the automobile.

Still another object of the invention is to provide apparatus which will be inexpensive to manufacture.

Yet another object of the invention is to provide apparatus which is easy to install on virtually any automobile.

It has been found that these and other objects of the invention may be attained in apparatus for obstructing rotational movement of an associated steering wheel of an associated automobile where the steering wheel has spokes connecting a hub to a rim. The apparatus includes a bar having a length that is greater than the diameter of the associated steering wheel with which the apparatus cooperates. The bar has first and second axial portions. The apparatus includes first and second means for engaging at least two spokes of the associated steering wheel and means for securing the first and second means for engaging respectively to the first and second axial portions of the bar. The apparatus also includes means for engaging the spokes of the steering wheel to the bar.

In some cases the bar also includes means for pivotally connecting the first and second axial portions of the bar. The means for pivotally connecting may be disposed intermediate the first and second means for engaging and each of the means for engaging the associated spokes of the steering wheel includes first and second arcuate members. The arcuate members may be pivotally connected together and include means for a latching engagement around one of the spokes of the associate steering wheel.

The means for engaging the axial portions of the bar include a sleeve and the sleeve is dimensioned and configured to allow rotational movement thereof about the bar. The bar may include at least one shoulder to limit axial movement of the sleeve on the bar. Some embodiments may limit axial motion of each of the sleeves on the bar. The means for pivotally connecting the first and second axial portions of the bar may include a yoke member and in some cases includes a tongue.

BRIEF DESCRIPTION OF THE DRAWING

The invention will be better understood by reference to the accompanying drawing in which.

DETAILED DESCRIPTION OF THE PREFERRED EMBODIMENT

Figure 1:
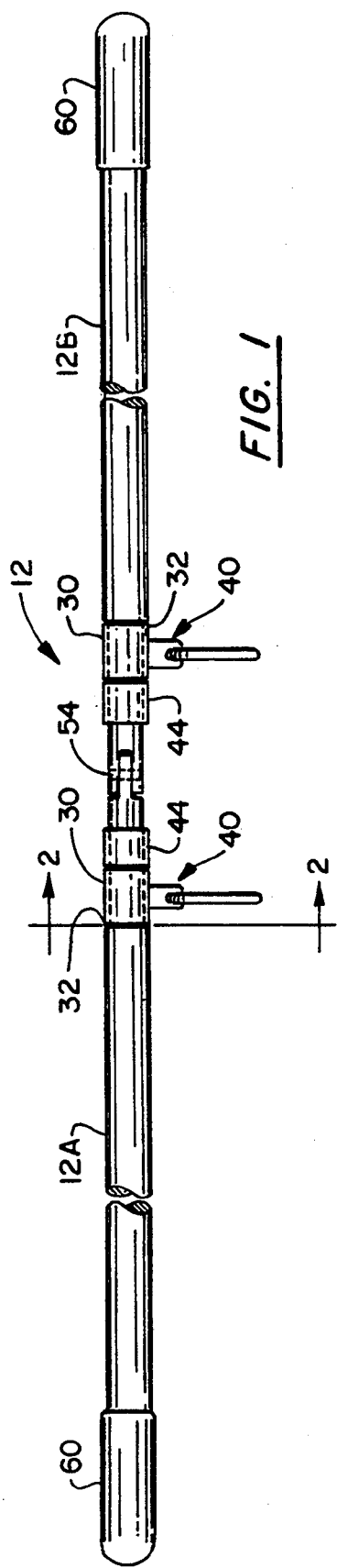
FIG. 1 is a front elevational view of the apparatus in accordance with one form of the invention.
Figure 3:
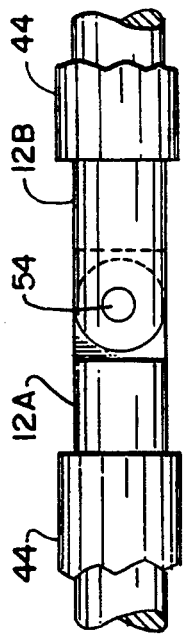
FIG. 3 is a fragmentary plan view of the joint coupling the axial portion of the apparatus shown in FIG. 1 in greater detail.
Figure 4:
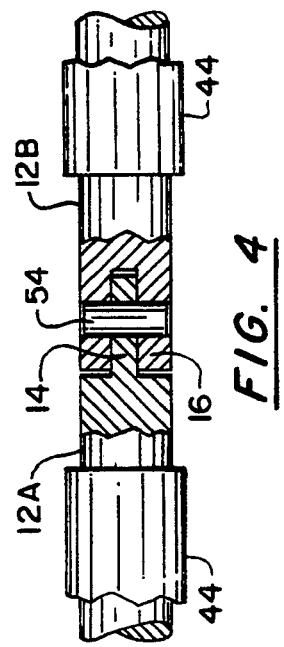
FIG. 4 is a fragmentary side elevational view in partial section further illustrating the joint illustrated in FIG. 3.
Figure 2:
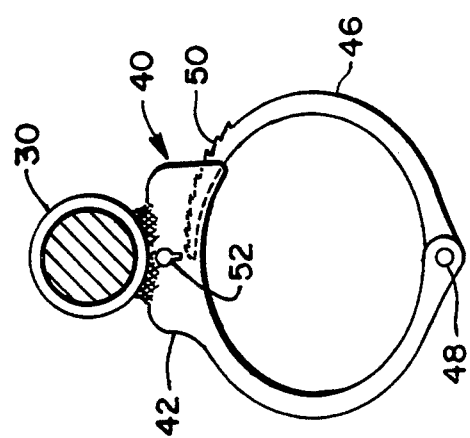
FIG. 2 is a sectional view taken along the line 2—2 of FIG. 1.

Referring now to FIGS. 1-4 there is shown the steering wheel locking apparatus in accordance one form of the invention. The apparatus includes an arm 12 having respective axial portions 12A, 12B that respectively have a flat generally planar tongue 14 and a yoke 16 dimensioned and configured for mutual engagement. A pin 18 extends through the yoke 16 and the tongue 14 to allow pivoting motion between the portions 12A and 12B.

The portions 12A, 12B are sufficiently long so that when installed on an associated steering wheel will preclude easy rotation of the steering wheel. Each portion 12A, 12B has fixed thereto a cuff assembly 40. Preferably, the respective cuff assemblies are disposed sufficiently close to the pin 16 so that they will engage the associated steering wheel near the hub thereof. Each portion 12A, 12B is secured to a cuff assembly 40 by a sleeve 30 that is disposed around the circumference of the portions 12A, 12B.

Preferably, the respective sleeves 30 are prevented from sliding toward the axial extremity of the respective portions 12A, 12B by respective shoulders 32 on the portions 12A, 12B. As best seen in FIG. 1 the axial extremities of the portions 12A, 12B have an outer diameter that is substantially the same as the outer diameter of the sleeves 30, 30. It will be understood that the portions 12A, 12B have a smaller diameter from the respective shoulders 32, 32 to the center of the bar 12. Thus the apparatus may be assembled by sliding the respective sleeves 30 on the inboard as viewed ends of the portions 12A, 12B until they are disposed in abutting relationship with the respective shoulders 32. Thereafter, respective annular members 44 are placed on the inboard ends of the portions and secured in place. For example, the annular members 44 may have a hole (not shown) in the surface thereof and the member 44 may be secured by a weld between the individual annular member and the respective portions 12A, 12B.

The cuff assembly 40 is substantially the same as those used for hand cuffing prisoners, although the size will vary for particular installation. For example, for some vehicles it will be necessary to have a substantially larger diameter than the diameter that is necessary for engaging the wrist of a human being. Each cuff member further includes a second arcuate portion 46 that is connected by a pivot 48 to the main body 42. Ratchet teeth 50 allow for adjustability for the individual application. A key hole 52 cooperates with an associated key (not shown) for release to the apparatus from a steering wheel. In some cases the key hole may be disposed in front face (visible in FIG. 1) of the main body 42.

The respective portions 12A, 12B are assembled with tongue 14 engaging the yoke 16 and a through pin 54 coupling the portion 12A, 12B for relative pivotal motion. Ordinarily the pin 54 will be welded to the yoke 16 to preclude a thief from merely driving the pin out. In other embodiments other means for securing the pin may be used such as a threaded connection where a slot is used to cause the engagement of the threads. The slot may be shaped like the slot in a rest room stall that allows only a clockwise driving force to be applied or the slot may be ground away after initial assembly.

Preferably, the entire apparatus 10 will manufactured of tempered hardened steel to prevent tampering by any would-be thief. The only exception would be rubber or plastic end cap 60, disposed respectively at the axial extremities of the portions 12A, 12B.

Ordinarily the sleeves 30, 30 will be constructed to allow pivotal motion about the axis of the respective portions 12A, 12B so that the user may install the apparatus on a greater variety of automobiles. Normally, a plurality of lengths of axial portions 12A, 12B will be provided to consumers so that various embodiments will fit various automobiles. In addition, the sizes of cuff members 40 may be provided in a plurality of sizes to accommodate different sizes of vehicles.

Figure 5:
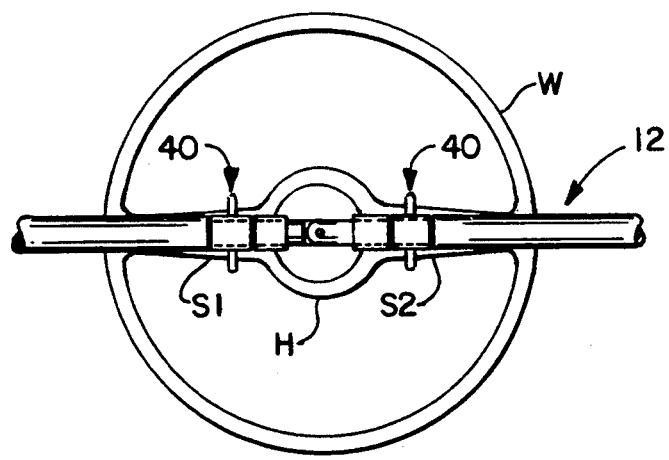
FIG. 5 is a view illustrating the installation of the apparatus of FIG. 1 installed on a steering wheel having spokes which are disposed at an included angle of 180 degrees about the rim of a steering wheel.

In operation, as best seen in FIG. 5, the apparatus 10 when installed on a steering wheel which is not dished and which has spokes that are disposed at an included angle of 180 degrees will be as shown in FIG. 5. Cuff members 40 engage respective spokes S1 and S2 of a steering wheel W near the hub of the steering wheel W. It will be apparent that it is preferable that the cuff members 40 engage the spokes near the hub to prevent a thief from sawing the spokes of and merely steering the car with the spokes that extend from the hub. It will be understood that if the spokes are cut off near the hub it will require a very strong thief to steer the car with only small stubs of the spokes connected to the hub.

In the simple case where the spokes S1, S2 are 180 degrees apart, there is no necessity for relative pivotal motion between the portions 12A and 12B. If the steering wheel W is dished it may be necessary for user to install the apparatus with the portions 12A, 12B pivoted with respect to each other about the pin 18.

Figure 6:
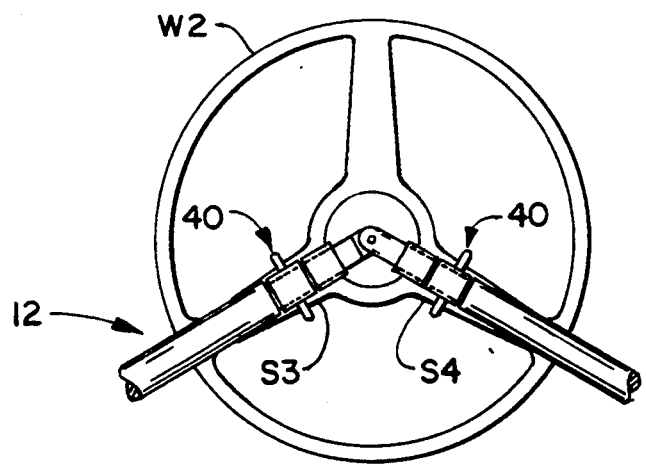
FIG. 6 is a view illustrating the installation of the apparatus of FIG. 1 installed on a steering wheel having spokes which are disposed at an included angle of 270 degrees about the rim of a steering wheel and the entire steering wheel is generally dish shaped.

Such pivotal motion is also necessary for installations where the spokes to be engaged are disposed at some angle other than an included angle of 180 degrees. For example, as shown in FIG. 6 with an included angle of 270 degrees, the respective portions 12A, 12B of the arm 12 are pivoted about the pin 54.

Figure 7:
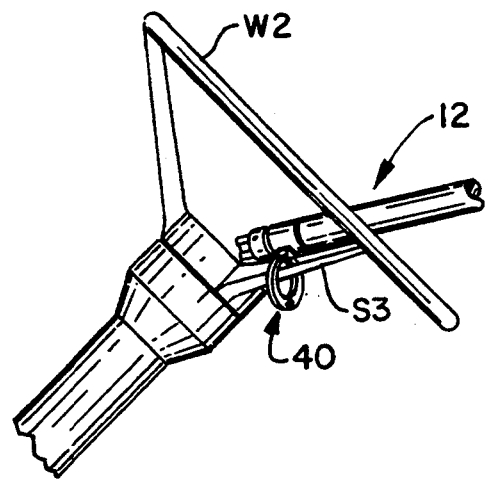
FIG. 7 is a side view of the apparatus shown in FIG. 6 further illustrating the manner of operation of the apparatus in accordance with the present invention on a steering wheel that is dished.

It will be seen that because the sleeves 30 of each cuff member 40 are rotatable the apparatus allow easy cooperation with the spokes S3, S4 of the steering wheel W2. As will be seen in FIG. 7, this can be accomplished even with steering wheels that are dished in the manner shown. It will thus be seen that the apparatus in accordance with the present invention may be used to prevent theft of an automobile. In the preferred embodiment of the invention the cuff members 40 are disposed close to the geometric center of the wheel W so that even if the material which the spokes S are manufactured may be easily cut it will be necessary to cut the spokes between the cuff members 40 and the hub H. This would mean that it would be virtually impossible for a thief to apply sufficient force to the remaining portions of the spokes after the cut has been made and thus impossible to drive the car.

It will thus be seen that the theoretical advantages of existing bar devices for attaching to the steering wheel including ease of installation and flexibility that permits installation on a wide variety of vehicles while avoiding the disadvantages of the known devices which are vulnerable to cutting of the rim of the steering wheel.

In some embodiments of the invention, the apparatus may not include the pin 54. Other embodiments may provide other means for engaging the spokes of the steering wheel without departing from the spirit of the invention.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

What is claimed is:

1. Apparatus for obstructing rotational movement of an associated steering wheel of an associated automobile, the associated steering wheel having a central hub and an outer circular rim and a plurality of spokes having respective first axial extremities connected to the central hub and respective second axial extremities which are connected to the outer circular rim, wherein the apparatus comprises:
    a bar having a length that is greater than the diameter of the associated steering wheel with which said apparatus cooperates, said bar having first and second axial portions:
    first and second engaging means for securely engaging only two spokes of the associated steering wheel intermediate the hub and the rim; and
    first and second securing means for respectively securing said first and second engaging means respectively to said first and second axial portions of said bar.

2. The apparatus as described in claim 1, wherein: said bar includes means for facilitating connection to said spokes which comprises means for pivotally connecting said first and second axial portions of said bar, said means for pivotally connecting allowing movement between a first position in which said first and second axial portions are coaxial and a second position in which said first and second axial portions are not coaxial.

3. The apparatus as described in claim 2, wherein: said means for pivotally connecting is disposed intermediate said first and second engaging means.

4. The apparatus as described in claim 3, wherein: said first and second engaging means for engaging the associated spokes of the steering wheel each includes first and second arcuate members, said arcuate members being pivotally connected together and including means for a latching engagement around one of the spokes of the associated steering wheel.

5. The apparatus as described in claim 4, wherein: each of said first and second engaging means for engaging said axial portions of said bar include a sleeve.

6. The apparatus as described in claim 5 wherein: said sleeve is dimensioned and configured to allow rotational movement thereof about said bar.

7. The apparatus as described in claim 6, wherein: said bar includes at least one shoulder to limit axial movement of said sleeve on said bar.

8. The apparatus as described in claim 7 further including: additional means to limit axial motion of each of said sleeves on said bar.

9. The apparatus as described in claim 8 wherein: said means for pivotally connecting said first and second axial portions of said bar includes a yoke member.

10. The apparatus as described in claim 9 wherein: said means for pivotally connecting said first and second axial portions of said bar includes a tongue.

* * * * *